United States Patent
Helak et al.

(10) Patent No.: US 9,928,380 B2
(45) Date of Patent: Mar. 27, 2018

(54) MANAGING FILE USAGE

(71) Applicant: International Business Machines Corporation, Armonk, NY (US)

(72) Inventors: Dustin A. Helak, Tucson, AZ (US);
David C. Reed, Tucson, AZ (US);
Thomas C. Reed, Tucson, AZ (US);
Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1087 days.

(21) Appl. No.: 13/888,446

(22) Filed: May 7, 2013

(65) Prior Publication Data

US 2014/0337385 A1 Nov. 13, 2014

(51) Int. Cl.
*G06F 7/00* (2006.01)
*G06F 21/62* (2013.01)

(52) U.S. Cl.
CPC ................ *G06F 21/6245* (2013.01)

(58) Field of Classification Search
CPC ........... G06F 17/3007; G06F 17/30091; G06F 2221/2107; G06F 21/566
USPC ................ 707/694, 821; 705/51; 713/165
See application file for complete search history.

(56) References Cited

U.S. PATENT DOCUMENTS

| | | | |
|---|---|---|---|
| 5,898,781 A * | 4/1999 | Shanton | G06F 12/1408 340/5.26 |
| 6,205,580 B1 * | 3/2001 | Hirose | G06F 9/445 711/202 |
| 6,802,012 B1 * | 10/2004 | Smithson | G06F 21/564 709/206 |
| 6,820,091 B2 | 11/2004 | Weigelt | |
| 6,970,882 B2 | 11/2005 | Yao et al. | |
| 7,010,689 B1 * | 3/2006 | Matyas, Jr. | H04L 9/3073 713/160 |
| 7,725,490 B2 | 5/2010 | Hitchen et al. | |
| 8,005,786 B2 | 8/2011 | Li et al. | |
| 8,185,918 B2 | 5/2012 | Meerwald et al. | |
| 8,190,583 B1 | 5/2012 | Shekar et al. | |
| 9,081,982 B2 * | 7/2015 | Bradley, II | G06F 21/6218 |
| 9,117,089 B2 | 8/2015 | Yoo et al. | |
| 2003/0182285 A1 * | 9/2003 | Kuwata | G06F 17/3089 |
| 2005/0097061 A1 * | 5/2005 | Shapiro | G06F 21/6209 705/67 |
| 2006/0217999 A1 * | 9/2006 | Collard | G06F 17/30011 705/7.36 |
| 2010/0185452 A1 | 7/2010 | Satyavolu et al. | |
| 2010/0325701 A1 * | 12/2010 | Sun | H04L 63/08 726/4 |

(Continued)

OTHER PUBLICATIONS

Weaver, et al., "Maintaining Data Records: Practical Decisions Required for Data Set Prioritization, Preservation, and Access". Geoscience and Remote Sensing Symposium, Jul. 7-11, 2008. IGARSS 2008, vol. 3 pp. III-617-III-619. IEEE International.

*Primary Examiner* — Cheyne D Ly
(74) *Attorney, Agent, or Firm* — Nathan M. Rau

(57) ABSTRACT

Embodiments of a system and method are disclosed concerning the management of file usage. The method of controlling file access may manage a file with a target ID that has a sender and a recipient. The method may also establish a priority level key associated with the file. The priority level key may control file access. The method may provide the file access to the recipient if the recipient has access rights corresponding to the priority level key.

20 Claims, 6 Drawing Sheets

(56) References Cited

U.S. PATENT DOCUMENTS

2011/0314071 A1 12/2011 Johnson et al.
2012/0096053 A1 4/2012 Lehr et al.
2012/0167110 A1 6/2012 Mizuno

* cited by examiner

MANAGING FILE USAGE

FIELD

This disclosure generally relates to accessing files, and in particular, to managing the usage of accessed files.

BACKGROUND

Digital data usage, storage, and sharing can contain sensitive information that is not intended or expected to be shared with multiple parties or even multiple parties within a single group. Often data is shared with different groups or parties in order to review, analyze, or utilize for a specific purpose. When this occurs a sender will have to trust the recipient to keep data private and not share it with other groups. In order to ensure the trust of the sender, often the recipient provides assurance and privacy standards for data received, and some parties utilize third-party software to monitor access information and issue reports to senders.

SUMMARY

Embodiments of a system and method are disclosed concerning the management of file usage.

One embodiment provides for a method of controlling file access. The method may manage a file with a target ID that has a sender and a recipient. The method may also establish a priority level key associated with the file. The priority level key may control file access. The method may provide the file access to the recipient if the recipient has access rights corresponding to the priority level key.

One embodiment is directed toward a file access management system for managing file access. The system may include a file with a data set header. The system may also include an owning entity coupled to an accessing entity. The owning entity and accessing entity may each have an access method to read the data set header. The access method of the accessing entity may be configured to obtain permission from the owning entity to access the file.

BRIEF DESCRIPTION OF THE DRAWINGS

Like reference numbers and designations in the various drawings indicate like elements.

DETAILED DESCRIPTION

End users of data have traditionally been able to access the data or share the data freely from computer to computer without any access control. The lack of access control may allow the end user to share data beyond the intended end users. Cloud-based computing can provide access control to data such as a file on a server but not once a file is downloaded onto a local computer. Passwords and encryption methods may also provide access control but may not prevent the end user from sharing the password along with the data.

Data control at the recipient level may be implemented in some embodiments of this disclosure. This disclosure may provide for a file type and structure that provides updates and access information to an owning entity. The file may contain metadata that references the owning entity when scanned by an accessing entity, or recipient. Before reading a file, the accessing entity may wait to receive permission from the owning entity. The owning entity may provide permission to the accessing entity to access the file. The term permission may be used interchangeably with access rights throughout this disclosure.

In the following description, specific details of various embodiments are provided. However, some embodiments may be practiced with less than all of these specific details. In other instances, certain methods, procedures, components, structures, and/or functions are described in no more detail than to enable the various embodiments of the disclosure, for the sake of brevity and clarity.

Figure 1:
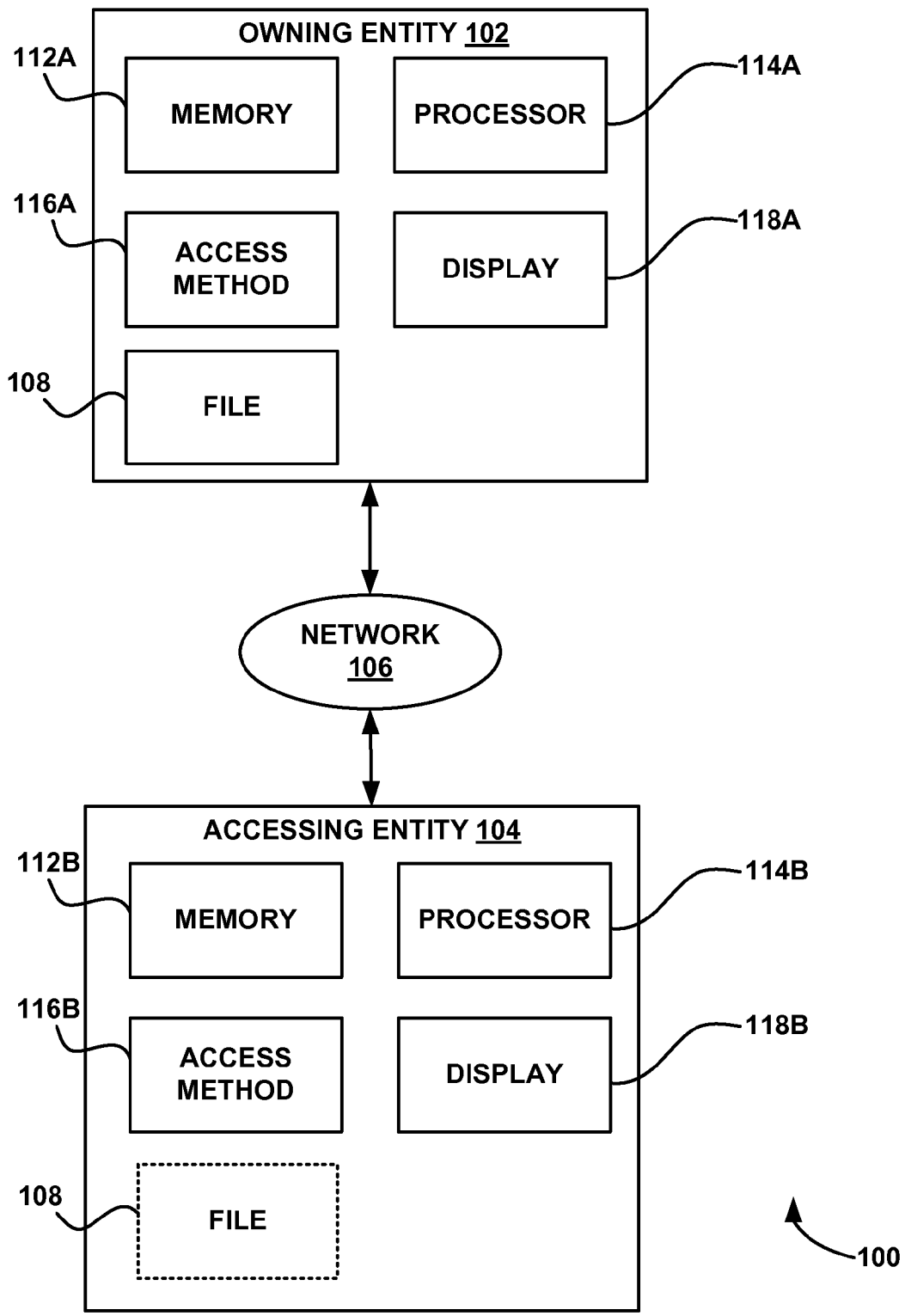
FIG. 1 illustrates a block diagram of a system, according to various embodiments.

FIG. 1 depicts a block diagram of a system 100, according to various embodiments. As depicted, the system 100 may include an owning entity 102, an accessing entity 104, and a network 106. Additionally, the owning entity 102 includes a file 108. In some embodiments, the file 108 may be referred to as a data set. Although the file 108 is depicted on the owning entity 102, the file 108 may also be located on the accessing entity 104, or both the owning entity 102 and the accessing entity 104. The owning entity 102 may include a memory 112A, a processor 114A, an access method 116A, and a display 118A. The accessing entity 104 may have similar components and may include a memory 112B, a processor 114B, an access method 116B, and a display 118B. Components of the owning entity 102 and the accessing entity 104 may have an similar function within the system 100. For the purposes of brevity, a component may be referred to generically throughout this disclosure. For example, the access method 116 may refer to either access method 116A or 116B.

The system 100 may allow a user to interface with the accessing entity 104. In one configuration, the owning entity 102 is a server and the accessing entity 104 is a client computer. In another configuration, the owning entity 102 may be a partition and the accessing entity 104 may be on another partition. Although the depicted system 100 is shown and described herein with certain components and functionality, other embodiments of the system 100 may be implemented with fewer or more components or with less or more functionality. For example, some embodiments of the system 100 may not include a network 106 and an owning entity 102. Hence, some embodiments of the system 100 include only the owning entity 102 and the file 108 and may be generated and stored only on the owning entity 102. Additionally, some embodiments of the system 100 may include a plurality of accessing entities 104 and a plurality of networks 106. Additionally, some embodiments of the system 100 may include similar components arranged in another manner to provide similar functionality, in one or more aspects. In one embodiment, the owning entity 102 is an array of servers. Additionally, multiple server instances may be run on a single owning entity 102.

As depicted, the owning entity 102 may host a particular application that the user may access through the accessing entity 104. By interfacing with the owning entity 102, the user on the accessing entity 104 may access a file 108 associated with the particular application on the owning entity 102. Although the system 100 depicts the file 108 on the owning entity 102, in some embodiments, the file 108 generated by the user is stored on the accessing entity 104 and transmitted to the owning entity 102. Alternatively, in some embodiments, the application associated with the file 108 runs on the accessing entity 104 in conjunction with a memory 112B and a processor 114B of the accessing entity 104. The file 108 may also exist as a plurality of files. For example, two versions of the file 108 may exist, one on the accessing entity 104 and one on the owning entity 102, or one on the accessing entity 104 and one on another accessing entity which is the same or similar to the accessing entity 104.

The accessing entity 104 may interface between the user and the owning entity 102. In one embodiment, the accessing entity 104 is a desktop, or laptop computer. In other embodiments, the accessing entity 104 is a mobile computing device that allows a user to connect to and interact with an application running on the owning entity 102 associated with the file 108. The accessing entity 104 may connect to the owning entity 102 via a local area network (LAN) or other similar network 106.

As explained above, in some embodiments, the user generates the file 108 on the accessing entity 104 in conjunction with the memory 112B and the processor 114B. In some embodiments, the memory 112 is a random access memory (RAM) or another type of dynamic storage device. In other embodiments, the memory 112 is a read-only memory (ROM) or another type of static storage device. In other embodiments, the illustrated memory 112 is representative of both RAM and static storage memory within the system 100. Hence, the memory 112 may store operations and functions associated with the generation of the file as well as a save operation to save the file to the memory 112. In other embodiments, the memory 112 is an electronically programmable read-only memory (EPROM) or another type of storage device. Additionally, some embodiments store the instructions as firmware such as embedded foundation code, basic input/output system (BIOS) code, or other similar code.

In one embodiment, the processor 114 is a central processing unit (CPU) with one or more processing cores. In other embodiments, the processor 114 is a graphical processing unit (GPU) or another type of processing device such as a general purpose processor, an application specific processor, a multi-core processor, or a microprocessor. Alternatively, a separate GPU may be coupled to the display device 118. In general, the processor 114 executes one or more instructions to provide operational functionality to the system 100. The instructions may be stored locally in the processor 114 and/or in the memory 112. Alternatively, the instructions may be distributed across one or more devices such as the processor 114, the memory 112, or another data storage device.

In one embodiment, the access method 116 controls the access to the file (discussed below). The access method 116 may prompt the owning entity 102 to give permission to access the file 108. In another embodiment, the access method 116 may obtain user information, system information, job information, and the request type for a file 108 that the accessing entity 104 requests to read. In some embodiments, the display device 118 is a graphical display such as a cathode ray tube (CRT) monitor, a liquid crystal display (LCD) monitor, or another type of display device. In one embodiment, the display device 118 is configured to visually display file 108 permission from the access method 116.

In an embodiment, the accessing entity 104 may request to access the file 108 from the owning entity 102. The accessing entity 104 may read the file 108 using the access method 116B and other files contained in the memory 112B. The access method 116B may communicate to the access method 116A to receive permission to open the file 108. The access method 116A may communicate to access method 116B in a manner further discussed in FIG. 6.

The network 106 may communicate traditional block input/output (I/O), such as over a storage area network (SAN). The network 106 may also communicate file I/O, such as over a transmission control protocol/internet protocol (TCP/IP) network or similar communication protocol. In some embodiments, the system 100 comprises two or more networks 106. Alternatively, the accessing entity 104 may be connected directly to the owning entity 102 via a backplane or system bus. In one embodiment, the network 106 may include a cellular network, other similar type of network, or combination thereof.

Figure 2:
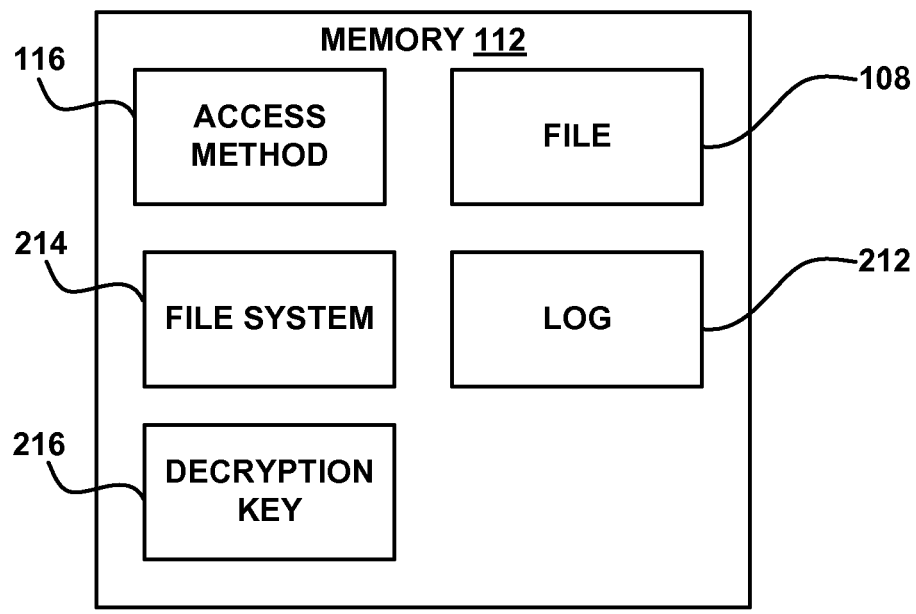
FIG. 2 illustrates a block diagram of a memory, according to various embodiments.

FIG. 2 depicts a block diagram of the memory 112, according to various embodiments. The memory 112 may correspond to the memory, e.g., 112A, 112B, of the owning entity 102 or the accessing entity 104 depicted in the system 100 of FIG. 1. As depicted, the memory 112 may have an access method 116, a log 212, a file 108, a file system 214, and a decryption key 216.

In one embodiment, the access method 116 from FIG. 1 resides in the memory. The access method 116 may determine if the file 108 on the accessing entity 104 has permission from the owning entity 104 to read or write the file 108. In another embodiment the access method 116 may be part of the operating system for the owning entity 102 or the accessing entity 104. In another embodiment, the access method 116 may be stored at a location accessible via the network 106.

In one embodiment, the log 212 may include a number of times that a file is accessed. The access method 116 may both read and write to the log 212. For example, the log 212 may be read to identify a list of one or more accessing entities 104 that have access permission. There may be more than one log 212 for different functions. For example, there may be a permission log, an accessing history, or a user ID log.

In one embodiment, the file system 214 is a software and/or hardware mechanism to store and organize electronic content, such as files and data stored in the files on the memory 112. The file system 214 generally allows a user to find, search for, and access the files stored on a storage device. Hence, in general, the file system 214 is a database for the storage, hierarchical organization, manipulation, navigation, access, and retrieval of files and data associated with the files. The file system 214 may include a disk file system, a flash file system, a database file system, a transactional file system, a network file system, and/or other similar file systems. The file system 214 may access data from a data storage device such as a hard disk or compact disc read only memory (CD-ROM) and require the maintenance of the physical locations of the files. Additionally, the file system 214 may access data on a file server, such as the owning entity 102 of FIG. 1, by acting as a client for a network protocol. The file system 214 may also include a virtual filing system such as a process file system (procfs).

The decryption key 216 may be an algorithm, program, or set of instructions that decrypts an encrypted file from either the accessing entity 104 or the owning entity 102. In some embodiments, the decryption key 216 may require another decryption program to decrypt an encrypted file. In other embodiments, the decryption key 216 may include the necessary components to decrypt an encrypted file.

Figure 3:
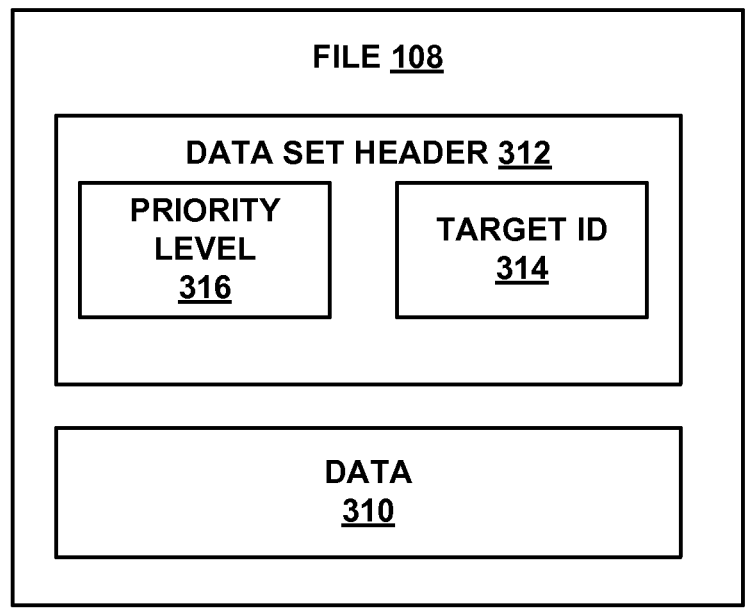
FIG. 3 illustrates a block diagram of a file, according to various embodiments.

FIG. 3 depicts a block diagram of the file 108, according to various embodiments. The file 108 may be on the owning entity 102, the accessing entity 104, or both. The file 108 may contain data 310 and a data set header 312. The data set header 312 may have metadata that directs the access method 116B to the access method 116A for permission from the owning entity 102, in an embodiment. The data set header 312 may be included in the file 108 as shown or may be a separate file. The data set header 312 may also be in a variety of formats, e.g., XML or binary. The XML format may be used as an object management group standard. The data set header 312 may contain information, or data, including a target ID 314 and a priority level 316. The target ID 314 may direct the access method 116B to a specific location on the owning entity 104. In some embodiments, the specific location may contain an IP address, an email address, or a server ID. The target ID 314 may store user information, system information, job information, and request type for the file 108, according to an embodiment.

The priority level 316 may describe the level of priority that the access method 316B gives to the file 108 to be read by the owning entity 102. Throughout this disclosure, the priority level 316 may also be referred to as the priority level key. The priority level 316 may be customized by the user in some embodiments. In another embodiment, the priority level 316 may allow users to prohibit access to their data. Multiple priority levels 316 may be used for specifying how frequent updates are sent to the target ID 314. For example, the priority level 136 may require the accessing entity 104 to send a report every three minutes to the owning entity 102 when the file 108 is accessed. Multiple priority levels 316 may also allow the user to organize the log 212 in FIG. 2 based on the confidentiality of the data being accessed. For example, if the priority level 316 is low, then the access method 116B may notify the access method 116A that the file 108 has been accessed. If the priority level 316 is high, then the access method 116B may request permission from the access method 116A to access the file 108. In addition to providing access control, the priority level 316 may provide access tracking. For example, the access tracking may also note how many times the file 108 is accessed. The priority level 316 may also provide deletion verification. For example, if the owning entity 102 wants to delete all copies of the file 108, then the access method 116 may remove the ability of the accessing entity 104 to read the file. The priority level 316 may also be used to track copies. For example, if there are multiple copies from multiple accessing entities 104, then the access method 116B for each one of the accessing entities may read the priority level 316 of the files. The priority level 316 may indicate that tracking of file usage is required by each one of the accessing entities. The tracking of file usage may occur by tracking the IDs of the accessing entities 104 and how often the IDs access the file 108. The priority level 316 may also indicate to the access method 116B that access is limited to only certain IDs or that the number of times that the file 108 can be accessed is capped.

Figure 4:
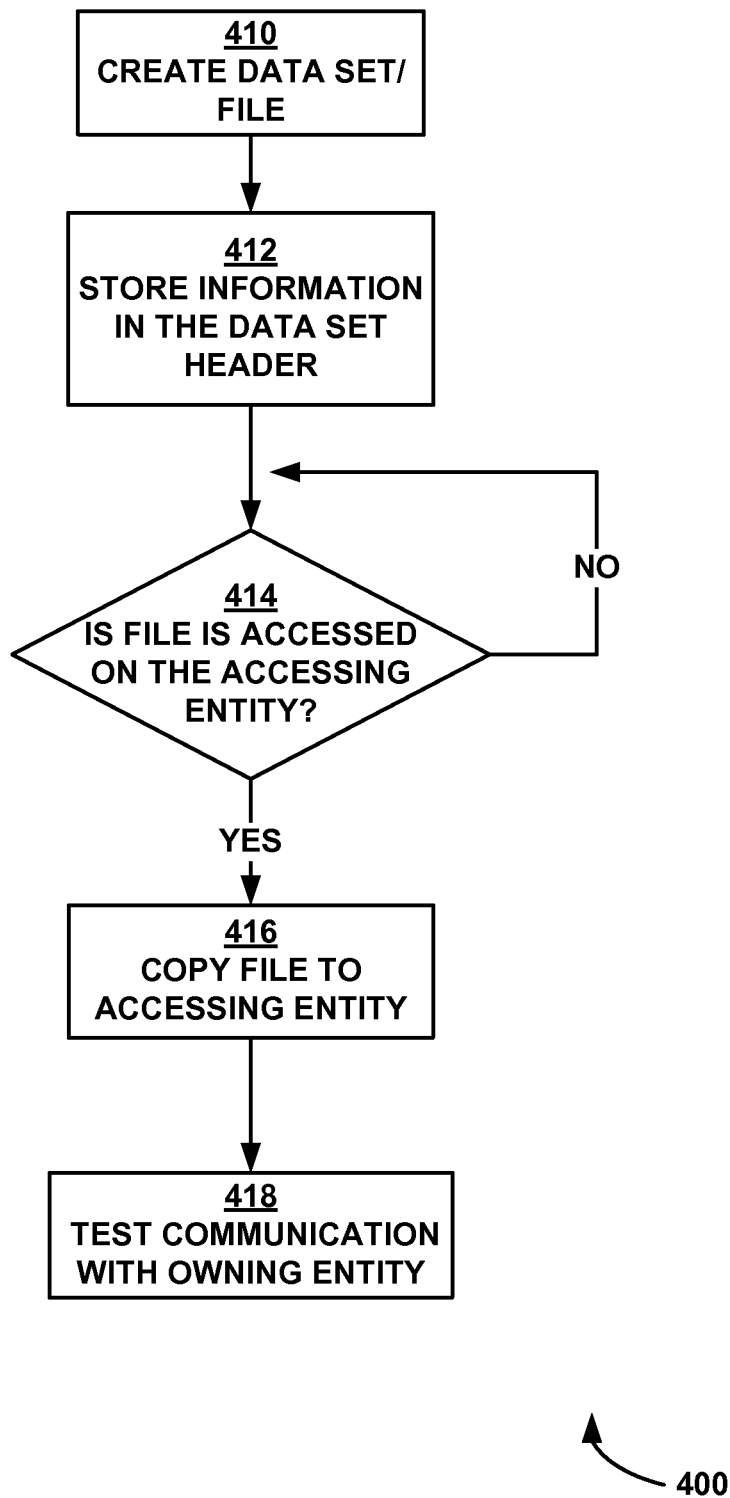
FIG. 4 illustrates a flowchart of a method to create a file with an access method, according to various embodiments.

FIG. 4 depicts a flowchart of a method 400 to create a file with an access method, according to various embodiments. The method 400 may begin at operation 410 where a file 108 is created. A file 108 may be created using a variety of methods and may include using the file system 218 in FIG. 2. After the file is created in operation 410, then method 400 may proceed to operation 412.

In operation 412, the access method 116 may store information in the data set header 312. The information may include the priority level 316 and the target ID 314, according to an embodiment. In some embodiments, the information may be stored in the data set header 312 when the file 108 is created. The target ID 314 may by default refer to the entity where it is created, e.g., the owning entity 102. However, some users may have multiple entities and so the target ID 314 may refer to other entities, e.g. one or more accessing entities.

Operation 412 may involve an additional determination operation where the owning entity 102 is first identified and tested to ensure that a connection can be formed with the accessing entity 104. For example, the access method may examine the network connections to determine whether the owning entity 102 in the target ID 314 is able to receive updates before identifying the owning entity 102 in the data set header 312. The determination of the network connection may occur, for example, by examining the downtime for the owning entity 102 or examining network latency of the owning entity 102 and comparing with defined parameters.

Operation 412 may include the creation of the priority level 316. The priority level 316 may be determined by input from the user. For example, the user of the owning entity 102 may desire access tracking for the file 108 or may want to restrict access to the file 108. In some embodiments, the owning entity 102 may create a default configuration for the priority level 316. For example, the owning entity 102 may restrict access to the file 108 as the default configuration. Once the data set header 312 is created, then the method 400 may proceed to operation 414.

The owning entity 102 may create the file 108 and data set header 312 by default. In operation 414, the access method 116 may determine whether the file 108 is needed on the accessing entity 104. In some embodiments, retaining a primary copy of a file 108 on the owning entity is not required. In this embodiment, if there is no standard repository for files 108, then the access method 116 may assume that the file 108 is needed on the accessing entity. The accessing entity 102 would need to store the file 108 in order to access the file 108. The owning entity 102 may need to retain the log 212 of usage and not the primary copy of the file 108. In other embodiments, the owning entity 102 may simply have a log of times that a particular file is accessed without a copy of the file 108.

In another embodiment, the owning entity 102 may contain the primary copy of the file 108. In this example, the owning entity 102 may either allow local copies of the file 108 or not allow local copies of the file 108. If local copies of the file 108 are allowed, then two versions of the file 108 may exist. For example, there may be a primary file and a secondary file where the secondary file needs approval from the primary file. If local copies of the file 108 are not allowed, then the file 108 is not accessed on the accessing entity 104. If the file 108 is not accessed on the accessing entity 104, then the method 400 may proceed until there is a file that is needed on the accessing entity 104.

After the file 108 is copied to the accessing entity 102, then the method 400 may proceed to operation 416. In operation 416, the file 108 may be copied onto the accessing entity 104. In some embodiments, the copying may be delayed until the file 108 is accessed by the accessing entity 104. In other embodiments, more than one copy of the file 108 may exist on one or more accessing entities 104.

In operation 418, the communication between the file 108 on the owning entity 102 and the file 108 on the accessing entity 104 may be tested. In some embodiments, the accessing entity may use the display 118 to communicate with the user that there is a connection between the two files.

Figure 5:
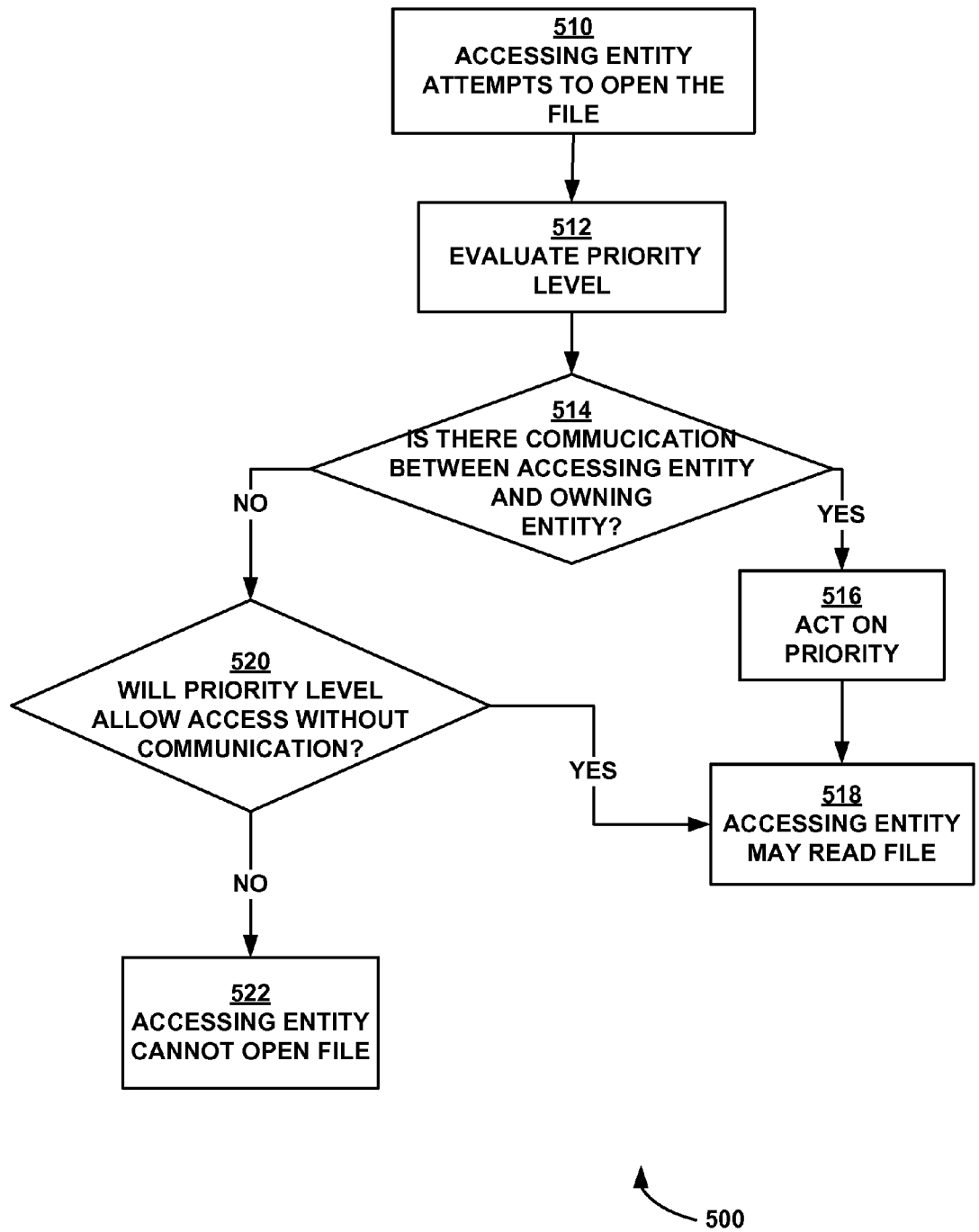
FIG. 5 illustrates a flowchart of a method to read a file with an access method, according to various embodiments.

FIG. 5 depicts a flowchart of a method 500 to read a file 108 with an access method 116, according to various embodiments. In the shown configuration, it is assumed that the access method 116B on the accessing entity 104 must first read the file 108, but other configurations are contemplated. The method 500 may begin at operation 510.

In operation 510, the accessing entity 104 may attempt to open the file 108. The file 108 may be accessed in a variety of methods, including through the file system 214 of the accessing entity 104. The file 108 may contain a data set header 312. The data set header 312 may include metadata that references an owning entity 302 that communicates with the accessing entity 104. In some embodiments, the access method 116B may read the data set header 312. The access method 116B may also evaluate the priority level 316 in operation 512. The priority level 316 may determine how the request to read the file 108 is received by the access method 116B. For example, the priority level 316, or priority level key, may indicate that permission from the owning entity is required before the accessing entity can access the file. If the data set header 312 contains a target ID 314 for a specific IP address, then the access method 116 may read the target ID 314 from the data set header 312. The accessing entity 104 may attempt to use the target ID 314 to communicate with the owning entity 102 through the network 106. The priority level 316 may contain instructions for the access method 116B to wait for permission to access the data 310 from the access method 116A.

In operation 514, the accessing entity 104 may determine whether there is communication between the accessing entity 104 and the owning entity 102. If there is communication, then the method 500 may proceed to operation 516.

In operation 516, the access method 116B may act according to the priority level 316. In some embodiments, the priority level 316 may define a threshold for file access For example, the priority level 316 may call for restricting access to only one accessing entity 104. In this example, the owning entity may read the priority level 316 and check the log 212 to see if another accessing entity accessed the data. In this example, whether the file was accessed by another accessing entity was the threshold. If the threshold was not met, e.g., another accessing entity accessing the file before the request for file access, then the owning entity 102 or the accessing entity 104 may deny permission for the accessing entity 104 to access the data 310. The threshold may be defined by the priority level 316, or in other embodiments, by the owning entity 102.

In another example, the priority level 316 may allow two accessing entities to access the data 310 on the file 108 and give permission to the accessing entity 104 if the log 212 indicates only one other accessing entity accessed the file 108. In one embodiment, operation 514 may require the owning entity 102 to give permission to the accessing entity 104 as part of operation 516.

Once the priority level 316 is acted upon, then the method 500 may proceed to operation 518. In operation 518, the accessing entity 104 may read the data 310 from the file 108.

If, in operation 514, the accessing entity 104 does not detect communication between the accessing entity 104 and the owning entity 102, then the method 500 may proceed to operation 520. In operation 520, a determination is made whether the priority level 316 will allow access without communication between the accessing entity 104 and the owning entity 102. In some embodiments, the priority level 316 may allow access to the file 108 without permission and the method 500 may proceed to operation 518. For example, if the priority level 316 gives access permission to any particular accessing entity but requires usage tracking, then the access method 116B may allow the file 108 to be read as long as the usage is transmitted into a log, e.g., log 212. Once a connection is established between the owning entity 102 and the accessing entity 104, then the log 212 may be synchronized with the log on the owning entity 102.

If the priority level 316 does not allow file 108 access without communication, then the method 500 may proceed to operation 522. In operation 522, the accessing entity 104 may not access the file 108. In some embodiments, the accessing entity 104 may alert the user that the access to the file 108 is restricted. In other embodiments, the accessing entity 104 may continue to wait for communication with the owning entity 102.

Figure 6:
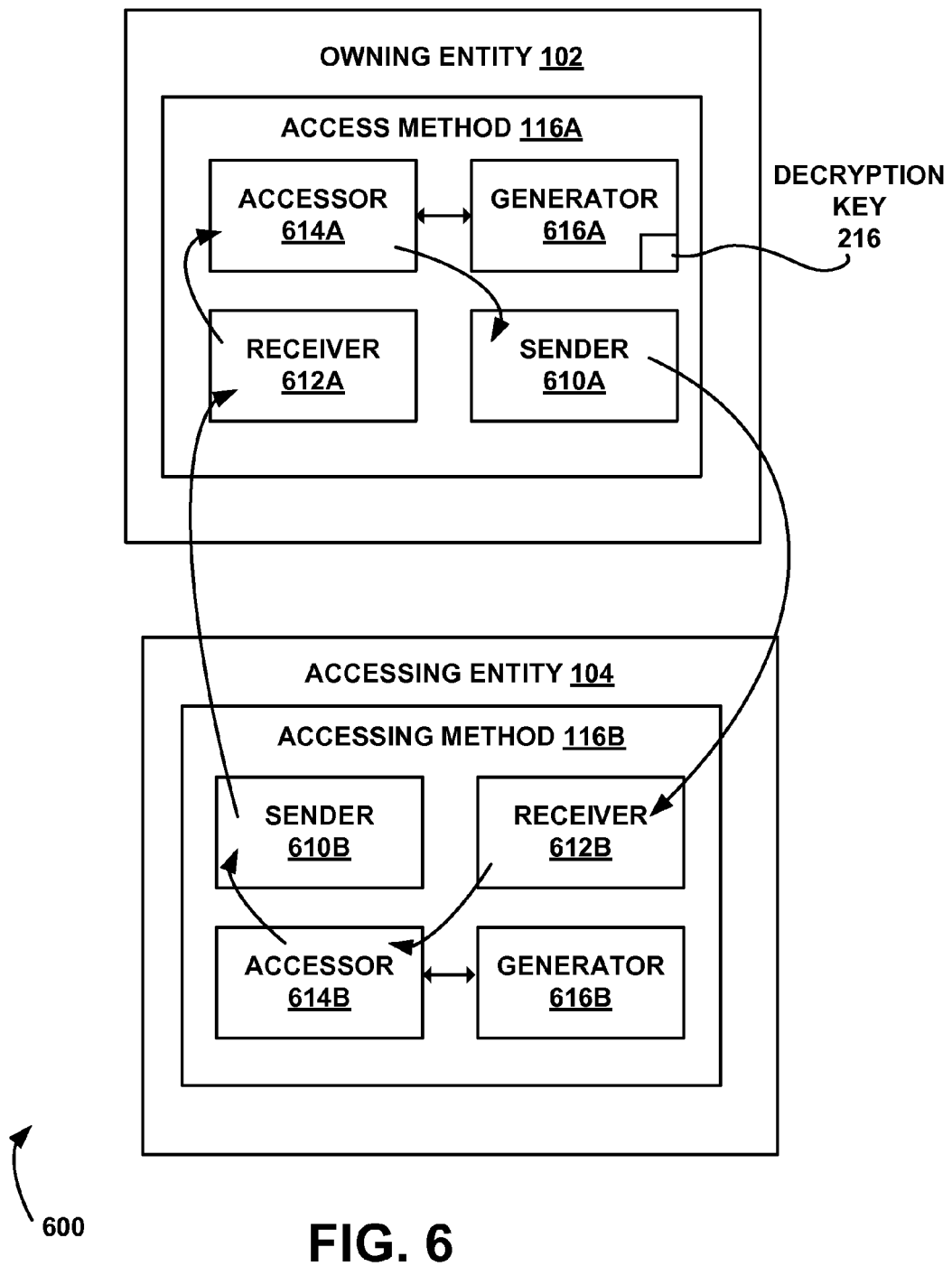
FIG. 6 illustrates a block diagram of an interaction between the access methods for an owning entity and an accessing entity, according to various embodiments.

FIG. 6 depicts a block diagram 600 of an interaction between the access methods 116 for the owning entity 102 and the accessing entity 104, according to various embodiments. The owning entity 102 and accessing entity 104 may each have an access method 116A and 116B, respectively. Both access method 116A and access method 116B may be structured similarly but the functions of the components may differ.

Access method 116A may have a sender 610A, a receiver 612A, an accessor 614A, and a generator 616A. Access method 116B may have a sender 610B, a receiver 612B, an accessor 614B, and a generator 616B. Components of the access method 116 may be referred to generically. For example, a sender 610A from access method 116A and a sender 610B from access method 116B may be referred to as sender 610 generically or sender 610A when referring specifically. The sender 610 may be configured to send updates to the receiver 612. For example, the sender 610A may send updates to the receiver 612B and the sender 610B may send updates to the receiver 612A. In some embodiments, the sender 610 may wait to receive signals from the accessor 614. The receiver 612 may be configured to receive the signal from the sender 610. The receiver 612 may direct the input from the sender 610. For example, the sender 610B may request to access a file with a priority level 316 that requires the log 212 to be accessed. In the above example, the receiver 612A may be configured to direct the request to the memory 200 where the log 212 is accessed, or, in another embodiment, direct the request to the accessor 214A.

The accessor 614 may grant access to the file 108. In some embodiments, the accessor 614 may control the reading and writing of the file 108. In other embodiments, the accessor 614 may be on both the accessing entity 104 and the owning entity 102. The accessor 614 may perform different functions on the owning entity 102 and the accessing entity 104, according to an embodiment. For example, the accessor 614A may record access to the file 108. In some embodiments, the accessor 614A may contain the log 212. In other embodiments, the accessor 614A may direct the access method 116B to the log 212 contained in the memory 112. The accessor 614A may also grant access to the file 108. In some embodiments, the accessor 614A may wait for a request from the access method 116B. In other embodiments, the accessor 614A may push a positive or negative request response to all access methods 116B.

In another example, the accessor 614B may control the reading and writing of the file 108. The accessor 614B may read the file 108 from the file system. The accessor 614B may also be responsible for writing either data 310 or the data set header 312. In some embodiments, the accessor 614B may wait for a request from the user. The accessor 614B may write the file 108 if the file 108 has the appropriate priority level 316. For example, if the priority level 316 only grants read-only access, then the accessor 614B may not write the file 108. In other embodiments, the accessor 614B may have a priority level 316 that allows for the writing of the data set header 312 but not the data 310. In some embodiments, the data set header 312 may be written to correct for an incorrect target ID 314. In other embodiments, the data set header 312 may be written by the owning entity 102 but not the accessing entity 104, e.g., 614A instead of 614B. The accessor 614B may also keep a usage log that describes how often the file has been accessed in an embodiment. The usage log may be synchronized with a usage log on 614A. In some embodiments, the usage log on 614B may be sent at predefined intervals, e.g., once per week.

The accessor 614 may work in conjunction with a generator 616. The generator 616 may generate the encryption for the file 108. In other embodiments, the generator 616 may create the data set header 312. For example, the generator 616 may be responsible for identifying the owning entity 102 in the target ID 312 or allowing the user to set a priority level 314 for the file 108. The generator 616 may perform similar or different functions on the owning entity 102 and the accessing entity 104. For example, the generator 616A may be used to encrypt the file 108 or create the data set header 312. The generator 616B may be responsible for generating a report and may be used when it is desired to send data back to the owning entity 102. In this example, the generator 616B may channel user modifications to the data 310 to the owning entity 102.

As an example of the operation of the accessing entity 116, arrows will be used to illustrate the information flow. As a starting point, the accessing entity 104 may access the file 108. In this example, the file 108 has a priority level that indicates that the owning entity 102 needs to give permission to access the file 108 and the file is encrypted. The accessing entity 104 may note the data set header 312 which may trigger the access method 116B. The access method 116B may refer the accessor 614B to read the data set header 312. The data set header 312 may be encrypted or unencrypted. If encrypted, then the data set header 312 may first be decrypted by the generator 616B. Then, the accessor 614B may read the priority level 316 and the target ID 314 from the data set header 312. The accessor 614B may derive that the priority level 316 requires permission from the owning entity to access the file 108. The target ID 314 may point to a specific location on the network 106 for the owning entity 102. The sender 610B may use the specific location and attempt to connect with the receiver 612A of the owning entity 102.

The receiver 612A may receive the request from the sender 610B. The receiver 612A may direct the request to the accessor 614A. The accessor 614A may scan the log 212 and determine that the accessing entity 104 is permitted to access the file 108 and record that the request was received in the log 212. In other embodiments, the accessor 614A may prompt a user for approval. The user input may be incorporated into the log 212 for future use. The accessor 614A may also send a decryption key 216 from the generator 616A through the sender 610A. The sender 610A may send the approval and the decryption key 216 to the receiver 612B. The receiver 612B may direct the approval and the decryption key 216 to the accessor 614B. The accessor 614B may read the approval and allow the file system to read the file 108. The accessor 614B may direct the decryption key 216 toward the generator 616B. In some embodiments, the generator 616B may use the decryption key 216 to perform the decryption of the file 108 and share the results with the accessor 614B. In another embodiment, the decryption algorithm may be on the accessor 614B.

Embodiments of the disclosure can take the form of an entirely hardware embodiment, an entirely software embodiment, or an embodiment containing both hardware and software elements. In one embodiment, the disclosure is implemented in software, which includes but is not limited to firmware, resident software, microcode, etc.

Furthermore, embodiments of the disclosure can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the disclosure have been described and illustrated, the disclosure is not to be limited to the specific forms or arrangements of parts so described and illustrated. The scope of the disclosure is to be defined by the claims appended hereto and their equivalents.

What is claimed is:

1. A method of controlling file access to files stored on a computer, comprising:

managing, with a central processing unit (CPU) of the computer, a file with a target ID that has a sender and a set of recipients;

establishing, with the CPU, a priority level key associated with the file, wherein the priority level key controls the file access, wherein the priority level key includes an indication that the number of times that the file can be accessed is capped;

receiving a first request for the file from a first recipient of the set of recipients;

determining, with the CPU, that the file has been accessed less than the capped number of times indicated by the priority level key by referencing a log that indicates how many times the file has been accessed;

providing the file access to the first recipient in response to determining that the file has been accessed less than the capped number of times;

updating, with the CPU, the log to indicate that the file has been accessed by the first recipient, wherein the updated log indicates that the file has been accessed the capped number of times;

receiving a second request for the file from a second recipient of the set of recipients;

determining, with the CPU, that the file has been accessed at least the capped number of times by referencing the log; and determining to block access to the file for the second recipient in response to determining that the file has been accessed at least the capped number of times.

2. The method of claim 1, wherein managing the file comprises:
creating the target ID by storing information in a data set header of the file, wherein the target ID refers to an owning entity; and
accessing the file by the first recipient.

3. The method of claim 2, wherein the creating the target ID is performed at the owning entity.

4. The method of claim 2, wherein the owning entity and the accessing entity are on the same computer.

5. The method of claim 2, further comprising testing communication between the owning entity and the accessing entity.

6. The method of claim 5, further comprising denying access rights to the recipient if there is no communication.

7. The method of claim 1, wherein managing the file comprises:
reading the target ID by the first recipient;
identifying an owning entity from the target ID; and
requesting access to the file from the owning entity.

8. The method of claim 1, wherein establishing the priority level key further comprises:
storing information in a data set header of the file; and
associating the information with the access rights.

9. The method of claim 8, wherein the information is based on user input.

10. The method of claim 1, wherein establishing the priority level key further includes:
reading the priority level key; and
determining the access rights from the priority level key.

11. The method of claim 1, wherein providing the file access includes;
evaluating the file to see if access rights of the file is within a threshold; and
granting the access rights to an accessing entity if the access rights are within the threshold.

12. The method of claim 11, wherein the threshold includes a list of authorized recipients in the log.

13. The method of claim 11, wherein the threshold comprises approval from the sender.

14. The method of claim 11, wherein providing the file access further comprises providing a decryption key to a respective recipient.

15. A file access management system, comprising:
a memory;
a file with a data set header stored within the memory;
one or more processing circuits communicatively coupled to the memory, wherein the one or more processing circuits are configured to:
manage the file with a target ID that has a sender and a set of recipients;
establish a priority level key associated with the file, wherein the priority level key controls file access, wherein the priority level key comprises an indication that the number of times that the file can be accessed is capped;
receive a first request for the file from a first recipient of the set of recipients;
determine that the file has been accessed less than the capped number of times indicated by the priority level key by referencing a log stored within the memory that indicates how many times the file has been accessed;
provide the file access to the first recipient in response to determining that the file has been accessed less than the capped number of times
update the log to indicate that the file has been accessed by the first recipient, wherein the updated log indicates that the file has been accessed the capped number of times;
receive a second request for the file from a second recipient of the set of recipients;
determine that the file has been accessed at least the capped number of times by referencing the updated log; and
determine to block access to the file for the second recipient in response to determining that the file has been accessed at least the capped number of times.

16. The file access management system of claim 15, wherein the data set header comprises:
the target ID that identifies the owning entity; and
the priority level key that identifies a permission required from the owning entity.

17. The file access management system of claim 15, wherein the permission is denied when there is no communication between the accessing entity and owning entity.

18. The file access management system of claim 15, wherein the permission is granted when the permission is within a threshold.

19. The file access management system of claim 18, wherein the threshold comprises a list of authorized recipients in the log.

20. The file access management system of claim 18, wherein the threshold comprises approval from a sender.

* * * * *